US008304362B2

(12) United States Patent
Lopez et al.

(10) Patent No.: US 8,304,362 B2
(45) Date of Patent: Nov. 6, 2012

(54) CORE/SHELL-TYPE CATALYST PARTICLES AND METHODS FOR THEIR PREPARATION

(75) Inventors: Marco Lopez, Frankfurt (DE); Michael Lennartz, Frankfurt (DE); Dan V. Goia, Potsdam, NY (US); Carsten Becker, Niedernberg (DE); Stéphanie Chevalliot, Ancemont (FR)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 12/438,978

(22) PCT Filed: Aug. 27, 2007

(86) PCT No.: PCT/EP2007/058889
§ 371 (c)(1),
(2), (4) Date: Dec. 22, 2009

(87) PCT Pub. No.: WO2008/025750
PCT Pub. Date: Mar. 6, 2008

(65) Prior Publication Data
US 2010/0086832 A1  Apr. 8, 2010

Related U.S. Application Data

(60) Provisional application No. 60/841,156, filed on Aug. 30, 2006.

(51) Int. Cl.
*H01M 4/88* (2006.01)
*H01M 4/02* (2006.01)
*H01M 4/36* (2006.01)
*H01M 4/90* (2006.01)
*H01M 4/92* (2006.01)
*H01M 4/94* (2006.01)
*B21D 51/16* (2006.01)
*B01D 53/34* (2006.01)
*B01J 21/18* (2006.01)
*B01J 23/00* (2006.01)
*B01J 23/40* (2006.01)
*B01J 23/74* (2006.01)
*B32B 27/02* (2006.01)
*B32B 5/16* (2006.01)
*B32B 15/02* (2006.01)
*B32B 17/02* (2006.01)
*B32B 19/02* (2006.01)
*B32B 21/02* (2006.01)
*B32B 23/02* (2006.01)

(52) U.S. Cl. ........ 502/185; 502/101; 502/180; 502/182; 429/523; 429/524; 429/525; 429/526; 429/527; 429/528; 428/403

(58) Field of Classification Search .................. 502/101, 502/180, 182, 185; 429/523–528; 428/403
See application file for complete search history.

(56) References Cited

U.S. PATENT DOCUMENTS

| 5,489,563 | A | 2/1996 | Brand |
| 6,007,935 | A | 12/1999 | Auer |
| 6,045,925 | A | 4/2000 | Klabunde et al. |
| 6,165,635 | A | 12/2000 | Auer |
| 6,350,408 | B1 | 2/2002 | Dye |
| 6,689,505 | B1 | 2/2004 | Albers |
| 6,861,387 | B2 | 3/2005 | Ruth |
| 7,052,777 | B2 * | 5/2006 | Brotzman et al. ............ 428/570 |
| 7,053,021 | B1 | 5/2006 | Zhong et al. |
| 7,205,255 | B2 * | 4/2007 | Yamamoto .................... 502/101 |
| 7,534,737 | B2 * | 5/2009 | Gajda ............................. 502/60 |
| 7,691,780 | B2 * | 4/2010 | Adzic et al. ................... 502/339 |
| 7,709,413 | B2 * | 5/2010 | Yoshida et al. ............... 502/313 |
| 7,855,021 | B2 * | 12/2010 | Adzic et al. ................... 429/424 |
| 7,902,104 | B2 | 3/2011 | Kalck |
| 2002/0146614 | A1 * | 10/2002 | Norskov et al. ................ 429/44 |
| 2003/0039857 | A1 | 2/2003 | Zhang et al. |
| 2006/0093892 | A1 | 5/2006 | Min |
| 2006/0134505 | A1 | 6/2006 | Wang |
| 2006/0135359 | A1 * | 6/2006 | Adzic et al. ................... 502/326 |
| 2007/0031722 | A1 * | 2/2007 | Adzic et al. .................... 429/44 |

(Continued)

FOREIGN PATENT DOCUMENTS

CN         1358596 A      7/2002

(Continued)

OTHER PUBLICATIONS

Zhang J., Lima F.H.B., Shao M.H., Sasaki K., Wang J.X., Hanson J., Adzic R.R., "Platinum monolayer on nonnoble metal-noble metal core-shell nanoparticle electrocatalysis for O2 reduction'" J. Physical Chem. B, v. 109, Nov. 11, 2005, pp. 22701-22704. PCT International Search Report for PCT/EP2007/058889, dated Dec. 28, 2007.
Hachem C., Bocquillon F., Zahraa O. and Bouchy M.: "Decolourization of textile industry wastewater by the photocatalytic degradation process" Dyes and Pigments , vol. 49, 2001, pp. 117-125.
PCT International Search Report for PCT/EP2007/058890, dated Jan. 14, 2008.
PCT International Written Opinion for PCT/EP2007/058889, dated Dec. 28, 2007.
PCT International Written Opinion for PCT/EP2007/058890, dated Jan. 14, 2008.
R.K. Roy, et al., "Deposition of continuous platinum shells on gold nanoparticles by chemical precipitation," Journal of Colloid and Interface Science, vol. 369 (2012), pp. 91-95.

*Primary Examiner* — Patricia L Hailey
(74) *Attorney, Agent, or Firm* — Levin Santalone LLP; John Santalone

(57) ABSTRACT

The invention discloses core/shell type catalyst particles comprising a $M_{core}/M_{shell}$ structure with $M_{core}$=inner particle core and $M_{shell}$=outer particle shell, wherein the medium diameter of the catalyst particle ($d_{core+shell}$) is in the range of 20 to 100 nm, preferably in the range of 20 to 50 nm. The thickness of the outer shell ($t_{shell}$) is about 5 to 20% of the diameter of the inner particle core of said catalyst particle, preferably comprising at least 3 atomic layers. The core/shell type catalyst particles, particularly the particles comprising a Pt-based shell, reveal a high specific activity. The catalyst particles are preferably supported on suitable support materials such as carbon black and are used as electrocatalysts for fuel cells.

11 Claims, No Drawings

U.S. PATENT DOCUMENTS

2007/0105005 A1* 5/2007 Tolmachev ............... 429/44
2010/0216632 A1* 8/2010 Adzic et al. ............... 502/101

FOREIGN PATENT DOCUMENTS

| | | | |
|---|---|---|---|
| EP | 1568427 A | | 8/2005 |
| JP | 2005 240088 A | | 9/2005 |
| KR | 10-0736538 B1 | | 7/2007 |
| WO | 99/07502 A | | 2/1999 |
| WO | 03/070810 A | | 8/2003 |
| WO | 2004/052998 A | | 6/2004 |
| WO | 2008/025750 | * | 3/2008 |
| WO | 2008/025751 A | | 3/2008 |

* cited by examiner

CORE/SHELL-TYPE CATALYST PARTICLES AND METHODS FOR THEIR PREPARATION

The present invention is directed towards advanced core/shell type catalyst particles for use as electrocatalysts in fuel cells, particularly in PEM fuel cells. The catalyst particles are characterized by a core/shell structure with precious metal or a precious metal based alloy in the surface layer (the "shell") and a metal in the inner layer (the "core"). The metal in the core comprises a precious metal or a base metal and/or alloys thereof, the metal in the shell comprises precious metal. The medium diameter of the catalyst particles is in the range of 20 to 100 nm; preferably the catalyst particles are supported on a support material, such as conductive carbon black.

The core/shell type catalyst particles, particularly the particles with a Pt-based shell, reveal a high specific activity. As an advantage, they possess a low precious metal content due to the core/shell structure The catalyst particles are characterized by a high specific mass activity ("SMA") and an improved performance in oxygen reduction reactions ("ORR") at the cathode of membrane fuel cells, such as PEMFC (Polymer electrolyte membrane fuel cells) or DMFC (Direct methanol fuel cells). They are designed for use as electrocatalysts in fuel cells, predominantly in mobile applications.

However, they may also be used in other applications, such as, e.g., in gas-phase catalysis or in catalytic converters for automobiles.

Fuel cells are gaining increased importance as mobile, stationary or portable power sources. In principle, fuel cells are gas-operated batteries, in which the chemical energy obtained from the reaction of hydrogen and oxygen is converted directly into electrical energy.

Electrocatalysts based on platinum (Pt) are routinely used on the anode and cathode side of PEM fuel cells. They comprise finely divided precious metal particles deposited on a conductive support material (generally carbon black or graphite). Normally, the concentration of precious metal is in the range from 20 to 60 wt.-%, based on the total weight of the catalyst.

In order to accelerate the commercialization of PEMFC technology, a significant reduction of precious metals such as platinum must be achieved. At the same time, the specific activity of the currently used electrocatalysts must be improved.

Due to the slow oxygen reduction kinetics, cathode Pt-loadings in MEAs for PEMFC are still relatively high and in the range of ~0.4 mgPt/cm$^2$ to meet the energy efficiency targets. These efficiency targets are reported in the literature as follows (ref to M. F. Mathias et al., The Electrochemical Society—Interface; Fall 2005, pages 24-35):

| | |
|---|---|
| Cell voltage | >0.65 V |
| MEA power density | >0.9 W/cm$^2$. |
| Specific power densities | ~0.5 gPt/kW |
| Specific mass activity (cathode catalyst): | >440 A/gPt |

These targets result in catalyst costs of ~18/kW (assuming $35/gPt for a supported Pt/C catalyst) and do not meet the stringent automotive cost requirements of <$10/kW, which is equivalent to a Pt consumption of <0.2 gPt/kW. While clearly the Pt cathode loading must be reduced to the level of 0.1 mgPt/cm$^2$ in order to meet the <0.2 gPt/kW target, this would lead to a 40 mV loss in cell voltage, which is not acceptable for efficiency reasons.

Based on these considerations, there is a need for improved cathode electrocatalysts with a fourfold enhanced activity to improve the overall power density towards the target of >0.9 W/cm$^2$. In addition to that, the catalyst has to survive load cycling with >300,000 voltage cycles between 0.6-1.1 V as a consequence of the dynamic operation of a car. With the electrocatalysts currently available, this load cycling leads to a significant loss of platinum and to metal particle sintering. As a consequence, dramatic losses of catalyst activity and performance occur with the electrocatalysts state of the art (ref to M. F. Mathias et al., cited above).

The standard electrocatalysts currently applied in PEMFC cathodes are based on Pt or Pt-alloys (e.g. Pt/Co, Pt/Ni or Pt/Cr) supported on conductive carbon black. These catalysts have been designed towards very high metal surface areas (measured as electrochemical surface area "ECA" in m$^2$/gPt) to maximize the utilization of each metal atom at the particle surface.

State of the art catalysts comprise 20-60 wt.-% Pt on a high surface area carbon black support and reveal metal surface areas (ECA) in the range of 80-120 m$^2$/gPt with a medium particle size (determined by TEM) below 3 nm. Specific activities ("SA") of these electrocatalysts are in the range of 0.15-0.2 mA/cm$^2$Pt [measured in a PEM single cell at standard operating conditions; i.e. cell voltage 0.9 V, temperature 80° C., pressure 150 kPa and full humidification].

In order to compare mass-related cost/performance aspects of different catalysts, the specific activity must be converted into the specific mass activity ("SMA" in mA/mgPt or A/gPt). When employing the ECA value given above, one obtains figures for the SMA in the range of 90-120 A/gPt for the electrocatalysts currently available on the market. Given the fourfold performance requirement needed, this would require SMA's of 360-480 A/gPt for advanced electrocatalysts.

When using various Pt-alloys (such as Pt/Cr, Pt/Co or Pt/Ni), it has been demonstrated that an increase of the specific activity (SA) by the factor of 2-4 compared to pure Pt can be achieved (ref to V. R. Stamenkovic et al., J. Am. Chem. Soc. 2006, volume 128, 8813-8819). However, this improvement alone is still not sufficient to meet the cost requirements of the automotive industry.

Considerable work has been conducted in the past to understand the influence of particle size effects to electrocatalyst performance. A comparison of standard Pt/C catalysts with different medium particle sizes shows an increase in activity with increasing particle size from 1 to 30 nm (RDE-measurements in 0.1M HClO$_4$; ref to P. N. Ross et al, Presentation "New electrocatalysts for fuel cells"; Project ID #FC10; DOE 2005). However, electrocatalysts comprising solid, uniform Pt particles with 30 nm medium size reveal very low values for the specific mass activity (SMA) due to the fact that most of the platinum is buried inside the particle and cannot be utilized for the catalytical reaction. As a consequence, solid catalyst particles with relatively coarse medium particle sizes lead to a higher Pt consumption, a lower electrochemical Pt surface area and thus result in low Pt utilization.

It is well known in the art, that only the surface of a catalyst promotes the catalytic reaction and the inside core does not contribute to the reactivity of the individual catalyst particle. Thus, it should be possible to further reduce the amount of platinum by having it present in a shell at the particle surface. Catalysts of this type are known as core/shell catalysts. Over the past years, such electrocatalysts were described in the literature.

J. Zhang et al. reported the preparation of core/shell particles as electrocatalysts for oxygen reduction. The core comprises of an alloy of a precious metal, whereas the shell consists of a Pt monolayer deposited by under potential deposition ("UPD"); ref to J. Zhang, F. H. B Lima et al, Journal of Physical Chemistry B Letters, 2005, 109, 22701-22704. The catalyst thus obtained is a $Pt_{ML}X/C$ (X=Au, Ag, Pd; ML=monolayer) with the metal particles comprising an inner core consisting of metal X and a monolayer of platinum in form of a shell on top of it.

Core/shell catalysts comprising a ruthenium core coated with platinum were described some years ago (ref to S. R. Brankovitch, J. X. Wang and R. R. Adzic, Electrochemical and Solid State Letters 2001, 4, A 217). The medium particle size of the Ru/Pt core/shell particles is in the range of 2.5 nm (by TEM).

U.S. Pat. No. 7,053,021 teaches the preparation of carbon-supported core/shell nano-particles of 1-3 nm size comprising a platinum-vanadium-iron alloy. An improvement by the factor of 2-4 is reported. Again, this improvement is still not sufficient to meet the targets of the automotive industry.

In summary, the electrocatalyst presently state of the art are not sufficient to meet the performance and cost requirements required for the widespread commercial introduction of fuel cell technology.

BRIEF DESCRIPTION OF THE INVENTION

It is one objective of the present invention to provide improved catalyst particles and catalyst materials with high specific mass activity (SMA), low precious metal content and high durability, particularly for fuel cell applications.

A further objective of the present invention is to provide a method for manufacturing of these catalyst particles and catalyst materials.

These objectives are achieved by the materials and processes described in the claims of the present invention.

The present invention is based on the principle of a core/shell structure in combination with the characteristics of a polycrystalline, bulk precious metal surface (preferably Pt). Thus, core/shell based catalyst particles are provided, in which the particle shell is big enough to show the characteristics of polycrystalline, bulk precious metal (e.g. platinum) and at the same time the particle core does not contain the precious metal present in the shell (preferably Pt).

By tayloring the catalyst particle surface towards the characteristics of polycrystalline bulk Pt, a markedly increased specific activity can be obtained. In order to achieve the characteristics of a bulk Pt surface, the particle should have the following features:
  a) a certain medium size (diameter), which is well above the size of the currently used Pt nanoparticles and
  b) a certain thickness of the outer shell. The thickness of the particle ($t_{shell}$) should be about 5 to 20%, preferably about 5 to 10% of the diameter of the inner particle core ($d_{core}$): The outer particle shell should further comprise at least 3 atomic layers of platinum atoms. In the case of Pt-based alloys, the shell should comprise at least 3 atomic layers of platinum atoms including the atoms of the alloying element(s).

DETAILED DESCRIPTION OF THE INVENTION

In the following, the characteristics of the catalyst particles according to the present invention are described in more detail.

The core/shell catalyst particles of the present invention are characterized by the general structure $$M_{core}/M_{shell}$$

wherein $$M_{core}=\text{metal of the particle core}$$

$$M_{shell}=\text{metal of the particle shell}$$

$M_{core}$ (the material of the particle core) is comprising base metals (i.e. non-precious metals), precious metals and/or mixtures or alloys thereof. Suitable base metals are taken from the group of transition metals of the Periodic System of Elements (PSE). Examples are aluminum (Al), titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), tantalum (Ta), tin (Sn), tungsten (W) and rhenium (Re) and/or mixtures or alloys thereof. Furthermore, $M_{core}$ may comprise precious metals or precious metal-containing alloys. Examples for precious metals are ruthenium (Ru), osmium (Os), rhodium (Rh), iridium (ir), palladium (Pd), platinum (Pt), silver (Ag) and gold (Au). Examples for suitable $M_{core}$ alloys comprising precious metals only are Ag/Au or Ag/Pd. Examples for suitable $M_{core}$ alloys comprising precious metals and base metals are Ag/Cu or Ag/Sn.

$M_{shell}$ (the material of the particle shell) comprises precious metals selected from the group consisting of ruthenium (Ru), osmium (Os), rhodium (Rh), iridium (Ir), palladium (Pd), platinum (Pt), silver (Ag) and gold (Au) and alloys or mixtures thereof. Preferably, platinum (Pt) or platinum and ruthenium (Pt/Ru) is used. Furthermore, platinum alloys with base metals such as nickel (Pt/Ni), chromium (Pt/Cr), cobalt (PtCo) or copper (PtCu) may also be used as particle shell. Ternary alloys may also be used (e.g. PtRuW).

The individual catalyst particles are characterized by a medium diameter ($d_{core+shell}$) in the range of 20 to 100 nm, preferably in the range of 20 to 50 nm and more preferably in the range of 20 to 40 nm:

$$d_{core+shell}=20 \text{ to } 100 \text{ nm}$$

As will be outlined later, a considerable reduction of the Pt content in the catalyst particle can be obtained with shell Pt layers having a thickness in the range of 1 to 3 nm. Thinner layers, particularly thin Pt monolayers, do not lead to the desired increase of specific activity. Thicker shell layers do not lead to the desired Pt reduction. The Pt-based shell layer must have a certain thickness in order to establish the polycrystallinity/bulk effects at the particle surface. The thickness of the outer particle shell ($t_{shell}$) should be about 5 to 20%, preferably about 5 to 10% of the diameter of the inner particle core ($d_{core}$):

$$t_{shell}=0.05 \text{ to } 0.2 \, d_{core}$$

wherein $$t_{shell}=(d_{core+shell}-d_{core})/2.$$

Preferably the thickness of the outer particle shell ($t_{shell}$) is in the range of about 1 to 3 nm. The outer particle shell should further comprise at least 3 atomic layers of platinum atoms. In the case of Pt-based alloys, it should comprise at least 3 atomic layers of platinum atoms including the atoms of the alloying element(s).

Electrochemical investigations have shown that the specific activity (SA) in the oxygen reduction reaction (ORR) for polycrystalline, bulk Pt is about the factor of 5-6 higher compared to standard Pt/C electrocatalysts:
  Specific activity (bulk Pt): 1.2 $mA/cm^2Pt$ (=12 $A/m^2Pt$)
  Specific activity (50 wt.-% Pt/C): 0.15-0.2 $mA/cm^2Pt$ (=1.5-2 $A/m^2Pt$)

For a supported cathode catalyst (50 wt.-% Pt/C) with an ECA of 80 m$^2$/g and a medium particle size of 3 nm, the specific mass activity is given by:

Specific mass activity (SMA): 120-160 A/g Pt

According to recent results, Pt particles of 20 nm medium particle size deliver about 50% of the specific activity of polycrystalline, bulk Pt (i.e. ~0.6 mA/cm$^2$Pt). These particles are showing an Electrochemical surface area (ECA) of 9 m$^2$/g Pt. Thus, the specific mass activity results in 54 A/gPt, which is only 33% of the mass activity of a standard 50 wt.-% Pt/C catalyst. A similar result is obtained for Pt particles with 30 nm medium particle size, which keep 70% of the bulk specific activity resulting in 0.8 mA/cm$^2$Pt (8 A/m$^2$Pt). Given the ECA of 6 m$^2$/gPt, this results in a mass activity of 48 A/gPt, which is only 30% of the activity of Pt/C catalyst (ref to Karl J. J. Mayrhofer, Ph.D. Thesis, Vienna University of Technology, Chapter 4.5, 96-102, Vienna, December 2005).

When applying the core/shell principle to these electrocatalysts, the specific mass activity is increased by reducing the amount of Pt in the particles:

By concentrating the Pt in a shell of at least 3 atomic layers (thickness $t_{shell}$ at least 1 nm) at the surface of a 20 nm core/shell particle, a reduction of the platinum mass content by about 70% based on the weight of the corresponding massive Pt particle can be obtained. Thus, the Pt mass content is only 30% of the weight of the corresponding massive Pt particle and the specific mass activity (SMA) increases theoretically by a factor of 3.3. This results in a SMA of 180 A/gPt.

For a 30 nm particle with a Pt shell thickness of $t_{shell}$=1 nm, a reduction of the Pt mass content by about 80% based on the weight of the corresponding massive Pt particle can be obtained. This would result in a specific mass activity (SMA) of 240 A/gPt (for a 20% Pt mass content). The reduction of the platinum mass content of the particle depends on the thickness of the outer particle shell ($t_{shell}$) and is generally higher than 40%, preferably higher than 50%. Core/shell-catalyst particles with thicker shell layers (thickness $t_{shell}>0.2\ d_{core}$) do not lead to the Pt mass reduction required.

When applying Pt-alloys as shell material for such particles (and taking in account the activity improvement by the factor of 2-4 reported earlier), the resulting electrocatalysts meet the 4× specific mass activity target of the automotive industry (i.e. >440 A/gPt).

In addition to that, catalyst particles with a medium size of ≧20 nm are significantly more stable towards sintering, Pt-leaching and Ostwald-ripening in ageing tests based on dynamic voltage cycling. Thus they reveal a higher durability.

The catalyst particles comprising the $M_{core}/M_{shell}$ structure described above are preferably supported on a suitable support material. Suitable support materials are high surface area powdered materials, such as inorganic oxides, carbon blacks, graphites or polymers. Preferably, electrically conductive support materials are used. Preferred support materials are high surface area electrically conductive carbon blacks, high surface area graphites, carbon nanotubes, high surface area conductive oxides or polymers. Suitable carbon blacks are for example Vulcan XC 72, Ketjenblack EC or Shawinigan Black, which are commercially available from different suppliers.

The amount of catalyst particles when supported on the electrically conductive support material (hereinafter called the "metal loading") is generally in the range of 5 to 90 wt.-%, preferably in the range of 10 to 80 wt.-% and most preferred in the range of 20 to 70 wt.-% (based on the total weight of the resulting electrocatalyst).

In a first embodiment of the present invention the catalyst particles are based on a core/shell structure comprising a base metal or precious metal core and a shell comprising platinum.

In a second embodiment of the present invention the catalyst particles are based on a core/shell structure comprising a base metal or precious metal core and a Pt-alloy shell. In the present application, the term "Pt-alloy" is to be interpreted in a very broad sense, i.e. also including homogeneous mixtures, heterogeneous mixtures, Pt doped with additional atoms, semi-alloys, partially alloyed states, segregated states etc). The shell may comprise, as example, platinum alloys with nickel (Pt/Ni), chromium (Pt/Cr), cobalt (PtCo), ruthenium (PtRu) or copper (PtCu). The Pt alloys can be in disordered or an ordered state, such as e.g. Pt$_3$Co or Pt$_3$Cr. Ternary alloys may also be used (e.g. PtRuW). Again, the catalyst particles are characterized by a medium size (diameter) in the range of 20 to 100 nm, preferably in the range of 20 to 50 nm and more preferably in the range of 20 to 40 nm.

In a third embodiment of the present invention, the Pt-alloy of the shell is comprising the base metal of the core. Examples for such compositions are Ni/PtNi, Ni/PtCo or Cu/PtRuCu. The Pt alloys can be in an ordered state, such as e.g. Pt$_3$Ni or Pt$_3$Co. The Pt-alloys of the shell may be prepared in these cases by suitable heat treatment procedures.

The core/shell catalyst particles can be prepared in a multi-stage process using suitable core particles as starting material. Usually, a two-step process is applied consisting of the preparation of the core particles in the first step and applying the shell material in the second step. A third step may be added to support the core/shell particles on the support material. Alternatively, the core particles may be prepared in a supported stage in the first step and subsequently coated with the shell material in the second step.

In a further alternative, the core particles are prepared in the first step and then simultaneously coated and supported on a support material in the second step. In this preferred method, the outer particle shell ($M_{shell}$) is applied to the metal of the inner particle core ($M_{core}$) in the presence of said support material.

This method is advantageous in terms of scalability, processing time and cost.

For the preparation of the metal core particles ($M_{core}$) of the present invention, preferably wet chemical reduction methods are applied, which are well known to the person skilled in the art. Aqueous media are preferred, but not required. As an example, the nickel core particles can be prepared by a polyol reduction process in presence of a stabilizer and a carbon black support.

The particle shell ($M_{shell}$) may be prepared also by wet chemical reduction techniques. However, alternative technologies suitable for metal coating of fine particles are suitable; examples are electroplating, cementation, UPD, plasma coating, vapour deposition or PVD/CVD methods. Suitable platinum alloys can be prepared by employing simultaneous or consecutive precipitation processes.

Supported core particles or supported core/shell particles can be prepared by methods and procedures known from the preparation of carbon black supported electrocatalysts as described for example in the patents U.S. Pat. No. 6,861,387, U.S. Pat. No. 6,689,505, U.S. Pat. No. 6,165,635, U.S. Pat. No. 6,007,934 and U.S. Pat. No. 5,489,563 of the assignee of the present invention.

For electrochemical testing of the catalyst particles, standard testing procedures are applied. The specific activity (mA/mgPt) can be determined by standard rotating disc electrode (RDE) measurement. In addition, tests in PEM single cells at standard operating conditions are performed.

The invention is explained in more detail by the following examples, which are considered illustrative, but not limiting.

EXAMPLE 1 a) Preparation of Ag Core-Particles 19.85 g of polysaccharide gum (Merck) are dispersed in 400 ml of deionised water for 1 hour. Next, 11.03 g of sodium hydroxide and 31.25 g silver nitrate (m=169.87 g/mol) are individually dissolved in 50 ml of deionised water. Both solutions are continuously added to the solution of the gum at room temperature within 1 hour. After the addition is completed, the solution is heated to 70° C. for one hour. A silver nanoparticle solution containing 19.8 g Ag is obtained. The diameter of the silver particles is about 20 nm (by TEM).

b) Preparation of the Pt Shell on the Ag Core Particles 20.1 ml of the Ag nanoparticle solution prepared in Example 1a) are diluted with 500 ml of deionised (DI) water. Next 1.95 g of platinum as Hexachloroplatinic acid solution (803 g, 25 wt.-% Pt) are added under intensive stirring. After 10 minutes of mixing, 100 ml of a solution of ascorbic acid (Merck) containing 7.05 g of ascorbic acid are added. The pH of the solution is now increased to pH=12 with 10 wt.-% NaOH. After pH 12 is reached, the reaction is diluted with DI water to a final volume of 1,000 ml. Finally, the temperature is increased to 70° C. The platinum is reduced by the ascorbic acid and forms a shell of about 3 nm thickness around the silver nanoparticles.

Particle Characteristics:

| | |
|---|---|
| Medium diameter of Ag core particles (by TEM): | 20 nm |
| Medium diameter of Ag/Pt particles (by TEM) | 26 nm |
| Medium thickness of Pt shell ($t_{shell}$) | ~3 nm |
| Medium thickness of Pt shell (in % of $d_{core}$) | ~15% |
| Pt mass reduction due to core/shell structure | ~45% |

In electrochemical testing by RDE, a high specific mass activity (SMA) is obtained.

EXAMPLE 2 a) Preparation of Au Core-Particles 0.204 g gold as a 0.885 g solution of $HAuCl_4$ (23.03% wt. Au, Umicore AG) are rinsed into 500 ml of DI water. Next, 290.56 mg of ascorbic acid are dissolved in 500 ml of DI water. For the preparation of the gold colloids both solutions are rapidly transferred into one single 2,000 ml glass beaker. The gold colloids are formed almost spontaneously. The diameter of the gold nanoparticles is determined by TEM to 25 nm.

b) Preparation of Au/Pt Core/Shell Particles

The gold sol prepared in Example 2a) is used as starting product (204 mg Au/l). First, 7.5 g of a 25 wt.-% Hexachloroplatinic acid solution (containing 1.88 g Pt) are added under intensive stirring. Next, 27.12 g of ascorbic acid are added. The solution is stirred for 30 min to dissolve the ascorbic acid. Then the pH is adjusted to pH=12 with 10 wt.-% NaOH solution. Finally, the solution is quickly heated to 70° C. to reduce the platinum and to prepare particles with a Pt shell of about 3 nm around the gold particles.

Particle Characteristics:

| | |
|---|---|
| Medium diameter of Au core particles (by TEM): | 25 nm |
| Medium diameter of Au/Pt particles (by TEM) | 30 nm |
| Medium thickness of Pt shell ($t_{shell}$) | ~2.5 nm |
| Medium thickness of Pt shell (in % of $d_{core}$) | ~10% |
| Pt-mass reduction due to core/shell structure: | ~58% |

In electrochemical testing by RDE, a high specific activity is obtained.

EXAMPLE 3 a) Preparation of Ag/Pt Particles Supported on Carbon Black 20.08 ml of Ag nanoparticles prepared in Example 1a) are diluted in 500 ml of DI water. Next, 1.9508 g of Pt as Hexachloroplatinic acid solution (7.8 g; 25 wt.-%, Umicore AG) are added under intensive stirring. After 10 minutes of mixing, 100 ml of an aqueous solution of ascorbic acid containing 7 g of ascorbic acid are added. Now 6.4 g of dry Ketjen Black EC300J (Akzo Nobel) are added to the solution and stirred for another 20 min to disperse the carbon black. The pH of the solution is increased to pH 12 with 10 wt.-% NaOH. After pH 12 is reached, the reaction is diluted with DI water to yield a final volume of 1,000 ml. Finally the temperature is increased to 70° C. The platinum is reduced by the ascorbic acid and forms a shell around the Ag particles. The resulting core/shell particles are well dispersed and supported on the carbon black to yield a Ag/Pt/C catalyst with about 30 wt.-% metal loading. Particle size measurement (by TEM) reveal a medium particle size of 26 nm.

Catalyst Characteristics:

| | |
|---|---|
| Medium diameter of Ag core particles (by TEM): | 20 nm |
| Medium diameter of Ag/Pt particles (by TEM) | 26 nm |
| Medium thickness of Pt shell ($t_{shell}$) | ~3 nm |
| Medium thickness of Pt shell (in % of $d_{core}$) | ~15% |
| Pt mass reduction due to core/shell structure: | ~45% |
| Metal loading on carbon black | ~30 wt.-% Ag/Pt |

In electrochemical testing by RDE, a high specific activity is obtained.

EXAMPLE 4 a) Preparation of Ni Core Particles Supported on Carbon Black

The nickel core particles are prepared by a reduction in polyol in presence of a stabilizer and a carbon black support. 7 g of Carbon Black (Akzo Nobel, Ketjen Black EC 300J) are dispersed in 500 ml diethyleneglycol (DEG) in a 1 liter three-neck flask for 15 min. 2.5 g nickel as 10.6 g nickel (II) acetate are added in solid form to the reaction mixture. The suspension is stirred for another 15 min at 500 rpm. At this time, the suspension is heated to 220° C. and the temperature is kept until the reduction of Ni is complete. The reaction is cooled down and the catalyst precursor is washed three times with deionised water and then isolated and dried. The nickel particles supported on carbon black show a medium diameter of 20 nm (measured by TEM).

b) Preparation of Ni/Pt Particles Supported on Carbon Black

The reaction mixture of a) is used at the stage of complete reduction of nickel. The suspension is cooled to 40° C. Now, 7.2 g of platinum as Hexachloroplatinic acid (25 wt.-%; 28.82 g) are dissolved in 200 ml of fresh DEG and then added to the mixture. The suspension is stirred for 15 min. Next, 26.02 g of solid ascorbic acid are added and the suspension is stirred for 30 min to completely dissolve the ascorbic acid. Finally the pH is adjusted to pH 12 with 10 wt.-% NaOH and the reaction is heated to 70° C. to reduce the platinum. After the reduction of platinum is completed, the mixture is cooled down to room temperature and the catalyst is washed 3 times with 30 ml of DI water. Finally the catalyst is dried under vacuum at 100° C.

Catalyst Characteristics:

| | |
|---|---|
| Medium size of Ni core particles (by TEM): | 20 nm |
| Medium size of Ni/Pt core/shell particles (by TEM): | 26 nm |
| Medium thickness of Pt shell ($t_{shell}$) | ~3 nm |
| Medium thickness of Pt shell (in % of $d_{core}$) | ~15% |
| Pt mass reduction due to core/shell structure: | ~45% |
| Metal loading on carbon black | ~30 wt.-% Ni/Pt on C |

In electrochemical testing by RDE, a high specific activity is obtained.

EXAMPLE 5 a) Preparation of Ni Core Particles

The Ni core particles are prepared by a reduction in polyol in the presence of a polysaccharide gum as stabilizer. Thus, 2.1 g of the stabilizer (predispersed in 50 ml of diethyleneglycol (DEG)) and 2.5 g nickel as 10.6 g nickel (II) acetate are mixed in 450 ml of DEG in a 1 liter 3-neck flask and stirred at 500 rpm for 30 min. At this time, the suspension is heated to 220° C. and the temperature is kept until the reduction of Ni is complete. The reaction mixture is cooled to room temperature. An isolated fraction of the mother liquor reveals the presence of Ni nanoparticles with 20 nm medium diameter (measured by TEM).

b) Preparation of Ni/Pt$_3$Co Particles Supported on Carbon Black

The reaction mixture of a) is used at the stage of completed reduction of nickel. The suspension is cooled to 40° C. First, 9.87 g of carbon black (Akzo Nobel, Ketjen Black EC 300J) are added to the solution of the Nickel nanoparticles. The suspension is stirred for 15 min to fully wet the carbon black. Now, 1.576 g of Pt as Hexachloroplatinic acid (25 wt.-%; 6.3 g) are dissolved in 100 ml of fresh DEG and then added to the mixture. The suspension is stirred for 15 min. Next, 0.158 g of solid cobalt (II) acetate are added and the suspension is stirred for 60 min to completely dissolve the cobalt acetate. Finally, the pH is adjusted to pH 6.1 with 10 wt.-% NaOH and the reaction is than heated to reflux (aprox. 240° C.) to reduce the platinum and the cobalt. After the reduction of the metals is completed, the mixture is cooled down to room temperature and the catalyst is washed 3 times with 30 ml of deionised water. Finally the catalyst is dried under vacuum at 100° C.

Catalyst Characteristics:

| | |
|---|---|
| Medium size of Ni core particles (by TEM): | 20 nm |
| Medium size of Ni/Pt$_3$Co core/shell particles (by TEM): | 22 nm |
| Medium thickness of Pt$_3$Co shell ($t_{shell}$) | ~1 nm |
| Medium thickness of Pt$_3$Co shell (in % of $d_{core}$) | ~10% |
| Pt$_3$Co mass reduction due to Ni core | ~75% |
| Metal loading on carbon black | ~30 wt.-% Ni/Pt$_3$Co on C |

In electrochemical testing by RDE, a high specific activity is obtained.

The invention claimed is:

1. Catalyst particles comprising a core/shell structure of $M_{core}/M_{shell}$ wherein $M_{core}$=metal of inner particle core, and $M_{shell}$=metal of outer particle shell and wherein said catalyst particles have a medium diameter ($d_{core+shell}$) in the range of 20 to 100 nm and wherein the outer particle shell ($M_{shell}$) comprises a precious metal selected from the group consisting of ruthenium (Ru), osmium (Os), rhodium (Rh), iridium (Ir), palladium (Pd), platinum (Pt), silver (Ag), gold (Au) and alloys or mixtures thereof and comprises at least 3 atomic layers and its surface is polycrystalline and has the characteristics of a bulk precious metal surface, wherein the thickness of the outer particle shell ($t_{shell}$) is about 5 to 20% of the diameter of the inner particle core ($d_{core}$):

$t_{shell}$=~0.05 to 0.2 $d_{core}$ wherein $t_{shell}=(d_{core+shell}-d_{core})/2$, and wherein the inner particle core ($M_{core}$) comprises a base metal or a precious metal.

2. The catalyst particles according to claim 1, wherein the inner particle core ($M_{core}$) comprises a base metal selected from the group consisting of aluminum (Al), titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), tantalum (Ta), tin (Sn), tungsten (W), rhenium (Re) and mixtures or alloys thereof.

3. The catalyst particles according to claim 1, wherein the inner particle core ($M_{core}$) comprises a precious metal selected from the group consisting of ruthenium (Ru), osmium (Os), rhodium (Rh), iridium (Ir), palladium (Pd), platinum (Pt), silver (Ag), gold (Au) and mixtures or alloys thereof.

4. The catalyst particles according to claim 1, wherein the outer particle shell ($M_{shell}$) comprises platinum (Pt) or alloys or mixtures thereof.

5. The catalyst particles according to claim 1, wherein the outer particle shell ($M_{shell}$) comprises an alloy of a precious metal with at least one base metal.

6. The catalyst particles according to claim 1, wherein the medium diameter of said catalyst particles ($d_{core+shell}$) is in the range of 20 to 50 nm.

7. Electrocatalyst for fuel cells, comprising the catalyst particles according to claim 1, supported on a support material.

8. Electrocatalyst according to claim 7, wherein the support material is an electrically conductive, high surface area carbon black or graphite.

9. Electrocatalyst according to claim 7, wherein the metal loading on the support material is in the range of 10 to 90 wt.-% based on the total weight of the electrocatalyst.

10. Method for manufacture of an electrocatalyst comprising using the catalyst particles of claim 1, wherein said catalyst particles are supported on a support material, and wherein the outer particle shell ($M_{shell}$) was applied to the metal of the inner particle core ($M_{core}$) in the presence of said support material.

11. Method for manufacture of the electrocatalyst according to claim 10, wherein the outer particle shell ($M_{shell}$) is applied by wet chemical reduction methods.

\* \* \* \* \*